United States Patent
Qi et al.

(10) Patent No.: US 12,528,854 B2
(45) Date of Patent: Jan. 20, 2026

(54) OPTIMIZATION OF CHIMERIC ANTIGEN RECEPTOR

(71) Applicant: BEIJING IMMUNOCHINA PHARMACEUTICALS CO., LTD., Beijing (CN)

(72) Inventors: Feifei Qi, Beijing (CN); Ting He, Beijing (CN); Xinan Lu, Beijing (CN); Yanping Ding, Beijing (CN); Fuyin Xiong, Beijing (CN); Mengmeng Liang, Beijing (CN)

(73) Assignee: BEIJING IMMUNOCHINA PHARMACEUTICALS CO., LTD., Beijing (CN)

( * ) Notice: Subject to any disclaimer, the term of this patent is extended or adjusted under 35 U.S.C. 154(b) by 775 days.

(21) Appl. No.: 17/799,492

(22) PCT Filed: Feb. 9, 2021

(86) PCT No.: PCT/CN2021/076247
§ 371 (c)(1),
(2) Date: Aug. 12, 2022

(87) PCT Pub. No.: WO2021/160124
PCT Pub. Date: Aug. 19, 2021

(65) Prior Publication Data
US 2023/0340063 A1    Oct. 26, 2023

(30) Foreign Application Priority Data
Feb. 13, 2020    (CN) .................... 202010091790.4

(51) Int. Cl.
*A61K 40/11*    (2025.01)
*A61K 40/31*    (2025.01)
(Continued)

(52) U.S. Cl.
CPC .......... *C07K 14/7051* (2013.01); *A61K 40/11* (2025.01); *A61K 40/31* (2025.01);
(Continued)

(58) Field of Classification Search
CPC .......... C07K 14/7051; C07K 14/70521; C07K 2319/02; C07K 2319/03; C07K 2319/33;
(Continued)

(56) References Cited

U.S. PATENT DOCUMENTS 7,446,190 B2 *   11/2008   Sadelain ............ C07K 14/7051
                                              536/23.53
11,578,115 B2 *   2/2023   Maus .................. C07K 14/7051
(Continued)

FOREIGN PATENT DOCUMENTS

| WO | WO-2018161017 A1 * | 9/2018 | ............. A61P 35/00 |
| WO | WO 2019/006427 A1 | 1/2019 | |
| WO | WO 2019/157461 A1 | 8/2019 | |

OTHER PUBLICATIONS

Kronenberg ZN, Fiddes IT, Gordon D, et al. High-resolution comparative analysis of great ape genomes. Science. 2018;360(6393): eaar6343. (Year: 2018).*

(Continued)

*Primary Examiner* — Joanne Hama
*Assistant Examiner* — Hannah Sunshine
(74) *Attorney, Agent, or Firm* — Birch, Stewart, Kolasch & Birch, LLP

(57) ABSTRACT

The present invention relates to the optimization of a chimeric antigen receptor, in particular, the modification of an intracellular signaling domain.

3 Claims, 3 Drawing Sheets

Specification includes a Sequence Listing.

(51) Int. Cl.
- A61K 40/42 (2025.01)
- C07K 14/705 (2006.01)
- C07K 14/725 (2006.01)
- C12N 5/0783 (2010.01)

(52) U.S. Cl.
CPC .... A61K 40/4211 (2025.01); C07K 14/70521 (2013.01); C12N 5/0636 (2013.01); *A61K 2239/38* (2023.05); *A61K 2239/48* (2023.05); *C07K 2319/02* (2013.01); *C07K 2319/03* (2013.01); *C07K 2319/33* (2013.01); *C12N 2510/00* (2013.01)

(58) Field of Classification Search
CPC .... C07K 2319/00; A61K 40/11; A61K 40/31; A61K 40/4211; A61K 2239/38; A61K 2239/48; C12N 5/0636; C12N 2510/00
See application file for complete search history.

(56) References Cited

U.S. PATENT DOCUMENTS

| | | | |
|---|---|---|---|
| 11,851,678 B2 * | 12/2023 | Mujacic | A61K 40/4215 |
| 2018/0186855 A1 | 7/2018 | Rosenthal | |

OTHER PUBLICATIONS

A0A2J8SAQ9_PONAB. UniProt. Accessed Jun. 24, 2025. https://www.uniprot.org/uniprotkb/A0A2J8SAQ9/entry. (Year: 2018).*

Benmebarek et al., "Killing Mechanisms of Chimeric Antigen Receptor (CAR) T Cells," International Journal of Molecular Sciences, vol. 20, 2019, p. 1283 (21 pages total).

Bettini et al., "CD3 ITAM diversity is required for optimal T cell receptor signaling and thymocyte development," J. Immunol., Sep. 1, 2017, vol. 199, No. 5, pp. 1555-1560.

Chae et al., "Qualitatively differential regulation of T cell activation and apoptosis by T cell receptor ζ chain ITAMs and their tyrosine residues," International Immunology, vol. 16, No. 9, 2004, pp. 1225-1236.

Eshhar et al., "Specific activation and targeting of cytotoxic lymphocytes through chimeric single chains consisting of antibody-binding domains and γ or ζ subunits of the immunoglobulin and T-cell receptors," Proc. Natl. Acad. Sci. USA, vol. 90, Jan. 1993, pp. 720-724.

Gattinoni et al., "A human memory T-cell subset with stem cell-like properties," Nat Med., vol. 17, No. 10, 2011, pp. 1290-1297.

Gross et al., "Expression of immunoglobulin-T-cell receptor chimeric molecules as functional receptors with antibody-type specificity," Proc. Natl. Acad. Sci. USA, vol. 86, Dec. 1989, pp. 10024-10028.

Guy et al., "Organization of proximal signal initiation at the TCR:CD3 complex," Immunol Rev., vol. 232, No. 1, Nov. 2009, pp. 7-21.

Imai et al., "Chimeric receptors with 4-1 BB signaling capacity provoke potent cytotoxicity against acute lymphoblastic leukemia," Leukemia, vol. 18, 2004, pp. 676-684.

Kersh et al., "Fidelity of T Cell Activation Through Multistep T Cell Receptor ζ Phosphorylation," Science, vol. 281, Jul. 24, 1998, pp. 572-575 (5 pages total).

Rohrs et al., "Computational Model of Chimeric Antigen Receptors Explains Site-Specific Phosphorylation Kinetics," Biophysical Journal, vol. 115, Sep. 18, 2018, pp. 1116-1129.

Spain et al., "TCRβ Transmembrane Tyrosines Are Required for Pre-TCR Function," J Immunol., vol. 168, 2002, pp. 127-133.

Zhao et al., "Structural design and engineered costimulation determines tumor rejection kinetics and persistence of CAR T cells," Cancer Cell, vol. 28, No. 4, Oct. 12, 2015, pp. 415-428.

Zhong et al., "Chimeric Antigen Receptors Combining 4-1BB and CD28 Signaling Domains Augment PI3kinase/AKT/Bcl-XL Activation and CD8+ T Cell-mediated Tumor Eradication," Molecular Therapy, vol. 18, No. 2, Feb. 2010, pp. 413-420.

* cited by examiner

SEQUENCE LISTING

<160> NUMBER OF SEQ ID NOS: 10

<210> SEQ ID NO 1
<211> LENGTH: 1461
<212> TYPE: DNA
<213> ORGANISM: Artificial Sequence
<220> FEATURE:
<223> OTHER INFORMATION: CD19 CAR molecular

<400> SEQUENCE: 1

| | | | | | |
|---|---|---|---|---|---|
| atgctgctgc | tggtgaccag | cctgctgctg | tgtgagttac | cacacccagc | attcctcctg | 60 |
| atcccagaca | tccagatgac | acagactaca | tcctccctgt | ctgcctctct | gggagacaga | 120 |
| gtcaccatca | gttgcagggc | aagtcaggac | attagtaaat | atttaaattg | gtatcagcag | 180 |
| aaaccagatg | gaactgttaa | actcctgatc | taccatacat | caagattaca | ctcaggagtc | 240 |
| ccatcaaggt | tcagtggcag | tgggtctgga | acagattatt | ctctcaccat | tagcaacctg | 300 |
| gagcaagaag | atattgccac | ttactttgc | caacagggta | atacgcttcc | gtacacgttc | 360 |
| ggagggggga | ctaagttgga | aataacaggc | tccacctctg | gatccggcaa | gcccggatct | 420 |
| ggcgagggat | ccaccaaggg | cgaggtgaaa | ctgcaggagt | caggacctgg | cctggtggcg | 480 |
| ccctcacaga | gcctgtccgt | cacatgcact | gtctcagggg | tctcattacc | cgactatggt | 540 |
| gtaagctgga | ttcgccagcc | tccacgaaag | ggtctggagt | ggctgggagt | aatatgggt | 600 |
| agtgaaacca | catactataa | ttcagctctc | aaatccagac | tgaccatcat | caaggacaac | 660 |
| tccaagagcc | aagttttctt | aaaaatgaac | agtctgcaaa | ctgatgacac | agccatttac | 720 |
| tactgtgcca | acattatta | ctacggtggt | agctatgcta | tggactactg | gggtcaagga | 780 |
| acctcagtca | ccgtctcctc | aattgaagtt | atgtatcctc | ctccttacct | agacaatgag | 840 |
| aagagcaatg | gaaccattat | ccatgtgaaa | gggaaacacc | tttgtccaag | tcccctattt | 900 |
| cccggacctt | ctaagccctt | tgggtgctg | gtggtggttg | ggggagtcct | ggcttgctat | 960 |
| agcttgctag | taacagtggc | ctttattatt | ttctgggtga | ggagtaagag | gagcaggctc | 1020 |
| ctgcacagtg | actacatgaa | catgactccc | cgccgccccg | ggcccacccg | caagcattac | 1080 |
| cagccctatg | ccccaccacg | cgacttcgca | gcctatcgct | cccgcgtgaa | gttcagccgc | 1140 |
| agcgccgacg | cccccgccta | ccagcagggc | cagaaccagc | tgtacaacga | gctgaacctg | 1200 |
| ggccgccgcg | aggagtacga | cgtgctggac | aagcgccgcg | gccgcgaccc | cgagatgggc | 1260 |
| ggcaagcccc | gccgcaagaa | ccccaggag | ggcctgtaca | acgagctgca | gaaggacaag | 1320 |
| atggccgagg | cctacagcga | gatcggcatg | aagggcgagc | gccgccgcgg | caaggccac | 1380 |
| gacggcctgt | accagggcct | gagcaccgcc | accaaggaca | cctacgacgc | cctgcacatg | 1440 |
| caggccctgc | cccccgcta | a | | | | 1461 |

<210> SEQ ID NO 2
<211> LENGTH: 486
<212> TYPE: PRT
<213> ORGANISM: Artificial Sequence
<220> FEATURE:
<223> OTHER INFORMATION: CD19 CAR molecular

<400> SEQUENCE: 2

Met Leu Leu Leu Val Thr Ser Leu Leu Leu Cys Glu Leu Pro His Pro
 1               5                  10                  15

Ala Phe Leu Leu Ile Pro Asp Ile Gln Met Thr Gln Thr Thr Ser Ser
             20                  25                  30

Leu Ser Ala Ser Leu Gly Asp Arg Val Thr Ile Ser Cys Arg Ala Ser

```
                35                  40                  45
Gln Asp Ile Ser Lys Tyr Leu Asn Trp Tyr Gln Gln Lys Pro Asp Gly
 50                  55                  60
Thr Val Lys Leu Leu Ile Tyr His Thr Ser Arg Leu His Ser Gly Val
 65                  70                  75                  80
Pro Ser Arg Phe Ser Gly Ser Gly Ser Gly Thr Asp Tyr Ser Leu Thr
                 85                  90                  95
Ile Ser Asn Leu Glu Gln Glu Asp Ile Ala Thr Tyr Phe Cys Gln Gln
            100                 105                 110
Gly Asn Thr Leu Pro Tyr Thr Phe Gly Gly Gly Thr Lys Leu Glu Ile
            115                 120                 125
Thr Gly Ser Thr Ser Gly Ser Gly Lys Pro Gly Ser Gly Glu Gly Ser
            130                 135                 140
Thr Lys Gly Glu Val Lys Leu Gln Glu Ser Gly Pro Gly Leu Val Ala
145                 150                 155                 160
Pro Ser Gln Ser Leu Ser Val Thr Cys Thr Val Ser Gly Val Ser Leu
                165                 170                 175
Pro Asp Tyr Gly Val Ser Trp Ile Arg Gln Pro Pro Arg Lys Gly Leu
            180                 185                 190
Glu Trp Leu Gly Val Ile Trp Gly Ser Glu Thr Thr Tyr Tyr Asn Ser
            195                 200                 205
Ala Leu Lys Ser Arg Leu Thr Ile Ile Lys Asp Asn Ser Lys Ser Gln
            210                 215                 220
Val Phe Leu Lys Met Asn Ser Leu Gln Thr Asp Asp Thr Ala Ile Tyr
225                 230                 235                 240
Tyr Cys Ala Lys His Tyr Tyr Gly Gly Ser Tyr Ala Met Asp Tyr
                245                 250                 255
Trp Gly Gln Gly Thr Ser Val Thr Val Ser Ser Ile Glu Val Met Tyr
            260                 265                 270
Pro Pro Pro Tyr Leu Asp Asn Glu Lys Ser Asn Gly Thr Ile Ile His
            275                 280                 285
Val Lys Gly Lys His Leu Cys Pro Ser Pro Leu Phe Pro Gly Pro Ser
            290                 295                 300
Lys Pro Phe Trp Val Leu Val Val Val Gly Gly Val Leu Ala Cys Tyr
305                 310                 315                 320
Ser Leu Leu Val Thr Val Ala Phe Ile Ile Phe Trp Val Arg Ser Lys
                325                 330                 335
Arg Ser Arg Leu Leu His Ser Asp Tyr Met Asn Met Thr Pro Arg Arg
            340                 345                 350
Pro Gly Pro Thr Arg Lys His Tyr Gln Pro Tyr Ala Pro Pro Arg Asp
            355                 360                 365
Phe Ala Ala Tyr Arg Ser Arg Val Lys Phe Ser Arg Ser Ala Asp Ala
            370                 375                 380
Pro Ala Tyr Gln Gln Gly Gln Asn Gln Leu Tyr Asn Glu Leu Asn Leu
385                 390                 395                 400
Gly Arg Arg Glu Glu Tyr Asp Val Leu Asp Lys Arg Arg Gly Arg Asp
                405                 410                 415
Pro Glu Met Gly Gly Lys Pro Arg Arg Lys Asn Pro Gln Glu Gly Leu
            420                 425                 430
Tyr Asn Glu Leu Gln Lys Asp Lys Met Ala Glu Ala Tyr Ser Glu Ile
            435                 440                 445
Gly Met Lys Gly Glu Arg Arg Arg Gly Lys Gly His Asp Gly Leu Tyr
            450                 455                 460
```

Gln Gly Leu Ser Thr Ala Thr Lys Asp Thr Tyr Asp Ala Leu His Met
465                 470                 475                 480

Gln Ala Leu Pro Pro Arg
            485

<210> SEQ ID NO 3
<211> LENGTH: 336
<212> TYPE: DNA
<213> ORGANISM: Artificial Sequence
<220> FEATURE:
<223> OTHER INFORMATION: CD3zeta intracellular region of unmodified CD19
      CAR molecule (CD3zeta-0)

<400> SEQUENCE: 3
agagtgaagt tcagcaggag cgcagacgcc cccgcgtacc agcagggcca gaaccagctc    60
tataacgagc tcaatctagg acgaagagag gagtacgatg ttttggacaa gagacgtggc   120
cgggaccctg agatgggggg aaagccgaga aggaagaacc ctcaggaagg cctgtacaat   180
gaactgcaga aagataagat ggcggaggcc tacagtgaga ttgggatgaa aggcgagcgc   240
cggaggggca aggggcacga tggcctttac caggtctca gtacagccac caaggacacc   300
tacgacgccc ttcacatgca ggccctgccc cctcgc                              336

<210> SEQ ID NO 4
<211> LENGTH: 112
<212> TYPE: PRT
<213> ORGANISM: Artificial Sequence
<220> FEATURE:
<223> OTHER INFORMATION: CD3zeta intracellular region of unmodified CD19
      CAR molecule (CD3zeta-0)

<400> SEQUENCE: 4

Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Arg Arg Lys Asn Pro Gln Glu Gly Leu Tyr Asn Glu Leu Gln Lys
    50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
            100                 105                 110

<210> SEQ ID NO 5
<211> LENGTH: 336
<212> TYPE: DNA
<213> ORGANISM: Artificial Sequence
<220> FEATURE:
<223> OTHER INFORMATION: CD19 CAR CD3zeta-3

<400> SEQUENCE: 5
agagtgaagt tcagcaggag cgcagacgcc cccgcgtacc agaagggcca gaaccagctc    60
tataacgagc tcaatctagg acgaagagag gagtacgatg ttttggacaa gagacgtggc   120
cgggaccctg agatgggggg aaagccgaga aggaagaacc ctcaggaagg cctgtacaat   180
gaactgcaga aagataagat ggcggaggcc tacagtgaga ttgggatgaa aggcgagcgc   240
cggaggggca aggggcacga tggcctttac cagggtctca gtacagccac caaggacacc    300
tacgacgccc ttcacatgca ggccctgccc cctcgc                               336

<210> SEQ ID NO 6
<211> LENGTH: 112
<212> TYPE: PRT
<213> ORGANISM: Artificial Sequence
<220> FEATURE:
<223> OTHER INFORMATION: CD19 CAR CD3zeta-3(Q15K)

<400> SEQUENCE: 6

Arg Val Lys Phe Ser Arg Ser Ala Asp Ala Pro Ala Tyr Gln Lys Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Arg Arg Lys Asn Pro Gln Glu Gly Leu Tyr Asn Glu Leu Gln Lys
    50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
            100                 105                 110

<210> SEQ ID NO 7
<211> LENGTH: 336
<212> TYPE: DNA
<213> ORGANISM: Artificial Sequence
<220> FEATURE:
<223> OTHER INFORMATION: CD19 CAR CD3zeta-12

<400> SEQUENCE: 7
agactgaagt tcagcaggag cgcagacgcc cccgcgtacc agaagggcca gaaccagctc    60
tataacgagc tcaatctagg acgaagagag gagtacgatg ttttggacaa gagacgtggc    120
cgggaccctg agatgggggg aaagccgaga aggaagaacc ctcaggaagg cctgttcaat    180
gaactgcaga agataagat ggcggaggcc tacagtgaga ttgggatgaa aggcgagcgc    240
cggaggggca aggggcacga tggcctttac cagggtctca gtacagccac caaggacacc    300
tacgacgccc ttcacatgca ggccctgccc cctcgc                               336

<210> SEQ ID NO 8
<211> LENGTH: 112
<212> TYPE: PRT
<213> ORGANISM: Artificial Sequence
<220> FEATURE:
<223> OTHER INFORMATION: CD19 CAR CD3zeta-12(V2L/Q15K/Y90F)

<400> SEQUENCE: 8

Arg Leu Lys Phe Ser Arg Ser Ala Asp Ala Pro Ala Tyr Gln Lys Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Arg Arg Lys Asn Pro Gln Glu Gly Leu Tyr Asn Glu Leu Gln Lys
    50                  55                  60

```
Asp Lys Met Ala Glu Ala Tyr Ser Glu Ile Gly Met Lys Gly Glu Arg
65                  70                  75                  80

Arg Arg Gly Lys Gly His Asp Gly Leu Phe Gln Gly Leu Ser Thr Ala
                85                  90                  95

Thr Lys Asp Thr Tyr Asp Ala Leu His Met Gln Ala Leu Pro Pro Arg
            100                 105                 110

<210> SEQ ID NO 9
<211> LENGTH: 336
<212> TYPE: DNA
<213> ORGANISM: Artificial Sequence
<220> FEATURE:
<223> OTHER INFORMATION: CD19 CAR CD3zeta-14

<400> SEQUENCE: 9
agactgaagt tcagcaggag cgcagaggcc cccgcgtacc agaagggcca gaaccagctc      60
tataacgagc tcaatctagg acgaagagag gagtacgatg ttttggacaa gagacgtggc     120
cgggaccctg agatgggggg aaagccgaga aggaagaacc ctcaggaagg cctgttcaat     180
gaactgcaga agataagat ggcggaggcc tacagtgaga ttgggatgaa aggcgagcgc      240
cggaggggca aggggcacga tggcctttac cagggtctca gtacagccac caaggacacc     300
tacgacgccc ttcacatgca ggccctgccc cctcgc                               336

<210> SEQ ID NO 10
<211> LENGTH: 112
<212> TYPE: PRT
<213> ORGANISM: Artificial Sequence
<220> FEATURE:
<223> OTHER INFORMATION: CD19 CAR CD3zeta-14(V2L/D9E/Q15K/Y90F)

<400> SEQUENCE: 10

Arg Leu Lys Phe Ser Arg Ser Ala Glu Ala Pro Ala Tyr Gln Lys Gly
1               5                   10                  15

Gln Asn Gln Leu Tyr Asn Glu Leu Asn Leu Gly Arg Arg Glu Glu Tyr
                20                  25                  30

Asp Val Leu Asp Lys Arg Arg Gly Arg Asp Pro Glu Met Gly Gly Lys
            35                  40                  45

Pro Arg Arg Lys Asn Pro Gln Glu Gly Leu Tyr Asn Glu Leu Gln Lys
        50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Phe Gln Gly Leu Ser Thr Ala
                85                  90                  95

Thr Lys Asp Thr Tyr Asp Ala Leu His Met Gln Ala Leu Pro Pro Arg
            100                 105                 110
```

OPTIMIZATION OF CHIMERIC ANTIGEN RECEPTOR

CROSS-REFERENCE TO RELATED APPLICATIONS

This application is the National Phase of PCT International Application No. PCT/CN2021/076247, filed on Feb. 9, 2021, which claims priority under 35 U.S.C. § 119 (a) to patent application No. 202010091790.4, filed in China on Feb. 13, 2020, all of which are hereby expressly incorporated by reference into the present application.

REFERENCE TO ELECTRONIC SEQUENCE LISTING

This application contains a Sequence Listing which has been submitted electronically in .txt format and is hereby incorporated by reference in its entirety. Said .txt copy, created on Jul. 25, 2022, is named "2022-08-12_Sequence-_listing_7234-0102PUS1.txt" and is 13,260 bytes in size. The sequence listing contained in this .txt file is part of the specification and is hereby incorporated by reference herein in its entirety.

BACKGROUND OF THE INVENTION

Field of the Invention

The present invention relates to an optimization of a chimeric antigen receptor (CAR), in particular, a modification of an intracellular signaling domain.

Background of the Invention

CAR-T technology combines the specificity of antibodies and the killing effect of T cells, thus forming an effective way of adoptive immunization (Benmebarek et al., Int. J. Mol. Sci. 20:1283, 2019). The original CAR usually consists of an extracellular antigen-binding domain, a hinge region, a transmembrane region, and an intracellular signaling domain (Gross et al., Proc. Natl. Acad. Sci. USA 86:10024-10028, 1989; Eshhar et al., Proc. Natl. Acad. Sci. USA 90:720-724, 1993). The second-generation CAR adds an intracellular co-stimulatory domain, usually located between the transmembrane region and the intracellular signaling domain (Imai et al., Leukemia 18:676-684, 2004; Zhao et al., Cancer Cell 28:415-428, 2015). The third-generation CAR adds two co-stimulatory domains (Zhong et al., Mol. Ther. 18:413-420, 2010). Although CAR-T technology has achieved great success in the treatment of hematological tumors, there are still some patients who do not respond or relapse after responding, and is still insufficient in the durability of efficacy and toxic side effects. In addition, CAR-T faces even more multiple obstacles such as limited efficacy and off-target effects in the treatment of solid tumors. Two important issues for the efficacy and safety of CAR-T are: 1) CAR-T amplification and persistence in vivo are insufficient; 2) CAR-T can cause toxic side effects such as cytokine storm, neurotoxicity, and off-target effects.

The reason for the above phenomenon is that the elements used in the current CAR molecules are basically wild-type, resulting in that the antigen recognition domain may not reach the optimal binding state for the formation of immune synapses when it binds to the target molecule, or that the signal transmission to the cell after the formation of the immune synapse is too strong or too weak, which thereby affects the survival, amplification of CAR-T cells in vivo, and the persistence of tumor cell killing performance and the regulation of the function of the entire immune system, which is ultimately reflected in the difference in clinical efficacy and safety.

By optimizing the CAR molecule, especially the intracellular signaling domain, the present invention improves the amplification efficiency and duration of the CAR-T cell in vivo, improves the tumor-killing efficiency, and reduces the toxic side effects, and ultimately achieves the purpose of improving clinical efficacy, reducing disease recurrence and reducing side effects.

BRIEF SUMMARY OF THE INVENTION

In one aspect, the invention relates to a method of modifying a signaling domain from CD3ζ. In one embodiment, the method comprises mutating one or more tyrosine phosphorylation sites within an immunoreceptor tyrosine-based activation motif in the CD3ζ signaling domain. In another embodiment, the method comprises mutating one or more amino acid residues in the near-membrane region in the CD3ζ signaling domain. In yet another embodiment, the method comprises mutating one or more tyrosine phosphorylation sites within an immunoreceptor tyrosine-based activation motif in the CD3ζ signaling domain, and mutating one or more amino acid residues in the near-membrane region in the CD3ζ signaling domain. The invention also relates to a modified signaling domain obtained by said method.

In one aspect, the invention relates to a modified signaling domain from CD3ζ. In one embodiment, the modified signaling domain comprises a mutation of one or more tyrosine phosphorylation sites in an immunoreceptor tyrosine-based activation motif. In another embodiment, the modified signaling domain comprises a mutation of one or more amino acid residues in the near-membrane region. In yet another embodiment, the modified signaling domain comprises a mutations of one or more tyrosine phosphorylation sites within an immunoreceptor tyrosine-based activation motif and comprises a mutation of one or more amino acid residues in the near-membrane region.

In one aspect, the invention relates to a method of optimizing a chimeric antigen receptor, which comprises as a step the above method of modifying a signaling domain from CD3ζ. The method of optimizing the chimeric antigen receptor of the present invention (specifically, the method of modifying the signaling domain from CD3ζ) can be used alone or in combination with other methods of optimizing the chimeric antigen receptor (e.g., a method of modifying a co-stimulatory domain). The present invention also relates to the optimized chimeric antigen receptor obtained by said method.

In one aspect, the present invention relates to an optimized chimeric antigen receptor, which comprises the above modified signaling domain from CD3ζ as a component. The optimized chimeric antigen receptor of the present invention may comprise not only the modified signaling domain from CD3ζ, but also other modified components, such as a modified co-stimulatory domain.

In one aspect, the present invention relates to a chimeric antigen receptor, which comprises the modified signaling domain of the present invention. In one aspect, the present invention relates to an animal cell, which comprises the chimeric antigen receptor of the present invention. In one embodiment, the animal is a mammal (eg, canine, feline, porcine, bovine, ovine, goat, and equine). In one embodiment, the animal is a rodent (eg, mouse, rat, hamster, guinea pig, and rabbit) or a non-human primate (eg, monkey, ape, and chimpanzee). In one embodiment, the animal is a human. In one embodiment, the cell is a lymphocyte, such as a T cell, B cell or NK cell.

BRIEF DESCRIPTION OF THE SEVERAL VIEWS OF THE DRAWING(S)

DETAILED DESCRIPTION OF THE INVENTION

Figure 1:
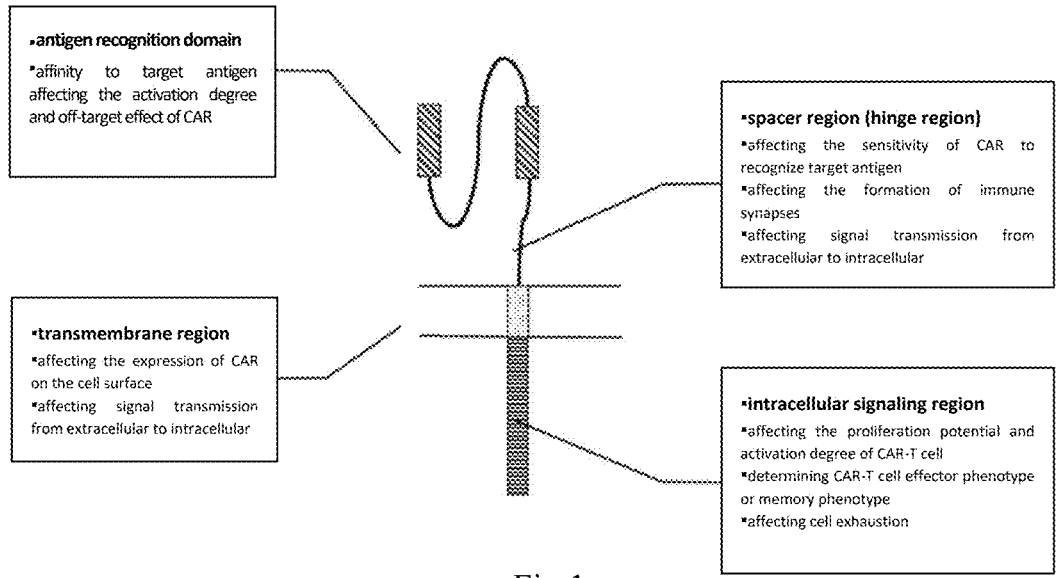
FIG. 1 shows CAR molecular elements and their effects on CAR-T function.

Unless otherwise indicated, the practice of the present invention will employ conventional techniques of molecular biology (including recombinant techniques), microbiology, cell biology, biochemistry and immunology, which are within the skill of the art. These techniques are fully explained in the literatures.

Unless otherwise defined, technical and scientific terms used herein have the same meaning as commonly understood by one of ordinary skill in the art to which this invention belongs.

1. Signaling Domain

Chimeric antigen receptors typically comprise the CD3ζ subunit as an intracellular signaling domain. In the process of T cell activation, the T cell receptor (TCR) causes tyrosine in the ITAM motif of the CD3ζ subunit of the TCR/CD3 complex to be phosphorylated by the Src family kinases Lck and Fyn with the help of molecules such as CD4 or CD8 and CD28 after binding to the MHC-antigen peptide complex. Each CD3ζ subunit has three immunoreceptor tyrosine-based activation motifs (ITAMs), which thereby allow signal amplification. The phosphorylated CD3ζ subunit can recruit and phosphorylate a ZAP70 molecule via the tandem SH2 domains therein. The phosphorylated ZAP70 further triggers a series of downstream reactions that ultimately lead to T cell activation. See Kersh et al., Science 281:572-575 (1998); Chae et al., Int. Immunol. 77:1225-1236 (2004).

The three ITAMs of the CD3ζ subunit have a total of six tyrosine phosphorylation sites (corresponding to Y21, Y32, Y59, Y71, Y90, Y101 in SEQ ID NO: 4). The order and number of phosphorylation of these six tyrosine sites play a key role in whether T cells can be activated or not, and play an important role in the development and differentiation direction of T cells after activation. A redundant immunoreceptor tyrosine-based activation motif in CD3ζ can promote T cell differentiation and exhaustion. On the other hand, during the activation of CD3ζ subunit, the spatial conformation of its near-membrane region also plays an important role in the formation of immune synapses. See Guy and Vignali, Immunol. Rev. 232 (1): 7-21, 2009.

In the present invention, by modifying the immunoreceptor tyrosine-based activation motif of the CD3ζ signaling domain, especially the tyrosine phosphorylation site therein, the intensity of the signal transmitted downstream by the CD3ζ signaling domain is regulated, so as to prolong the survival time of CAR-T cells in vivo, slow down the exhaustion of CAR-T cells, and finally achieve the purpose of improving the efficacy of CAR-T and reducing recurrence. On the other hand, by modifying the amino acid residues in the near-membrane region, the spatial conformation of the near-membrane region during activation is changed, so as to regulate the signal intensity and efficiency of the CD3ζ signaling domain, control the activation degree and development and differentiation direction of T cells, and ultimately improve the efficacy of CAR-T and reduce the toxic and side effects of CAR-T therapy.

In the present invention, CD3ζ may comprise, for example, the amino acid sequence set forth in NP_000725.1, wherein the signaling domain corresponds to amino acid residues at positions of 52-163 (SEQ ID NO: 4). Alternatively, CD3ζ can be other naturally occurring homologous amino acid sequences, such as allelic products, isoforms, homologs, paralogs, and the like. In such case, the signaling domain from CD3ζ is the portion corresponding to amino acid residues at positions of 52-163 of the amino acid sequence set forth in NP_000725.1 in the other naturally occurring homologous amino acid sequences.

2. Method of Modifying the Signaling Domain

In one aspect, the invention relates to a method of modifying a signaling domain from CD3ζ. (e.g., SEQ ID NO: 4, corresponding to positions 52-163 of the amino acid sequence set forth in NP_000725.1), which comprises mutating one or more tyrosine phosphorylation sites within an immunoreceptor tyrosine-based activation motif in the CD3ζ signaling domain. In one embodiment, the tyrosine phosphorylation site is selected from amino acid residues corresponding to Y21, Y32, Y59, Y71, Y90 and Y101 in SEQ ID NO:4. In one embodiment, the tyrosine phosphorylation site is Y90. In one embodiment, the mutation is a deletion or replacement. In one embodiment, the replacement is a conservative replacement. A conservative replacement refers to a replacement between amino acids of the same type. In one embodiment, the replacement is a non-conservative replacement. A non-conservative replacement refers to a replacement between amino acids of different types. The type of amino acids can be in terms of various properties, such as size, charge, acidity, hydrophilicity/hydrophobicity, polarity, amphiphilicity, and the like. In one embodiment, one or more of Y21, Y32, Y59, Y71, Y90, and Y101 are deleted. In one embodiment, Y90 is deleted. In one embodiment, one or more of Y21, Y32, Y59, Y71, Y90 and Y101 are replaced with F. In one embodiment, Y90 is replaced with F.

In one aspect, the invention relates to a method of modifying a signaling domain from CD3ζ. (e.g., SEQ ID NO: 4, corresponding to positions 52-163 of the amino acid sequence set forth in NP_000725.1), which comprises mutating one or more amino acid residues in the near-membrane region in the CD3ζ signaling domain. In one embodiment, the amino acid residue in the near-membrane region is selected from the amino acid residues at positions 1 to 18 of the N-terminus, i.e., amino acid residues corresponding to R1, V2, K3, F4, S5, R6, S7, A8, D9, A10, P11, A12, Y13, Q14, Q15, G16, Q17 and N18 in SEQ ID NO:4. In one embodiment, the amino acid residue in the near-membrane region is selected from V2, D9 and Q15. In one embodiment, the mutation is a deletion or replacement. In one embodiment, the replacement is a conservative replacement. A conservative replacement refers to a replacement between amino acids of the same type. In one embodiment, the replacement is a non-conservative replacement. A non-conservative replacement refers to a replacement between amino acids of different types. The type of amino acids can be in terms of various properties, such as size, charge, acidity, hydrophilicity/hydrophobicity, polarity, amphiphilicity, and the like. In one embodiment, V2, D9 and/or Q15 are deleted. In one embodiment, V2 is replaced with L, D9 is replaced with E, and/or Q15 is replaced with K.

The invention also relates to the modified signaling domain obtained by said method.

3. Modified Signaling Domain

In one aspect, the invention relates to an modified signaling domain from CD3ζ, compared to the native sequence of the signaling domain (e.g., SEQ ID NO: 4, corresponding to positions 52-163 of the amino acid sequence set forth in NP_000725.1), the modified signaling domain comprises a mutations of one or more tyrosine phosphorylation sites in an immunoreceptor tyrosine-based activation motif. In one embodiment, the tyrosine phosphorylation site is selected from amino acid residues corresponding to Y21, Y32, Y59, Y71, Y90 and Y101 in SEQ ID NO:4. In one embodiment, the tyrosine phosphorylation site is Y90. In one embodiment, the mutation is a deletion or replacement. In one embodiment, the replacement is a conservative replacement. A conservative replacement refers to a replacement between amino acids of the same type. In one embodiment, the replacement is a non-conservative replacement. A non-conservative replacement refers to a replacement between amino acids of different types. The type of amino acids can be in terms of various properties, such as size, charge, acidity, hydrophilicity/hydrophobicity, polarity, amphiphilicity, and the like. In one embodiment, one or more of Y21, Y32, Y59, Y71, Y90, and Y101 are deleted. In one embodiment, Y90 is deleted. In one embodiment, one or more of Y21, Y32, Y59, Y71, Y90 and Y101 are replaced with F. In one embodiment, Y90 is replaced with F.

In one aspect, the invention relates to an modified signaling domain from CD3ζ, compared to the native sequence of the signaling domain (e.g., SEQ ID NO: 4, corresponding to positions 52-163 of the amino acid sequence set forth in NP_000725.1), the modified signaling domain comprises a mutation of one or more amino acid residues in the near-membrane region. In one embodiment, the amino acid residue in the near-membrane region is selected from the amino acid residues at positions 1 to 18 of the N-terminus, i.e., amino acid residues corresponding to R1, V2, K3, F4, S5, R6, S7, A8, D9, A10, P11, A12, Y13, Q14, Q15, G16, Q17 and N18 in SEQ ID NO:4. In one embodiment, the mutation is a deletion or replacement. In one embodiment, the replacement is a conservative replacement. A conservative replacement refers to a replacement between amino acids of the same type. In one embodiment, the replacement is a non-conservative replacement. A non-conservative replacement refers to a replacement between amino acids of different types. The type of amino acids can be in terms of various properties, such as size, charge, acidity, hydrophilicity/hydrophobicity, polarity, amphiphilicity, and the like. In one embodiment, V2, D9 and/or Q15 are deleted. In one embodiment, V2 is replaced with L, D9 is replaced with E, and/or Q15 is replaced with K.

In one aspect, the invention relates to an modified signaling domain from CD3ζ, compared to the native sequence of the signaling domain (e.g., SEQ ID NO: 4, corresponding to positions 52-163 of the amino acid sequence set forth in NP_000725.1), the modified signaling domain comprises a mutation of one or more tyrosine phosphorylation sites in an immunoreceptor tyrosine-based activation motif, and comprises a mutation of one or more amino acid residues in the near-membrane region. In one embodiment, the tyrosine phosphorylation site is selected from amino acid residues corresponding to Y21, Y32, Y59, Y71, Y90 and Y101 in SEQ ID NO: 4. In one embodiment, the tyrosine phosphorylation site is Y90. In one embodiment, the amino acid residue in the near-membrane region is selected from the amino acid residues at positions 1 to 18 of the N-terminus, i.e., amino acid residues corresponding to R1, V2, K3, F4, S5, R6, S7, A8, D9, A10, P11, A12, Y13, Q14, Q15, G16, Q17 and N18 in SEQ ID NO:4. In one embodiment, the amino acid residue in the near-membrane region is selected from V2, D9 and Q15. In one embodiment, the mutation is a deletion or replacement. In one embodiment, the replacement is a conservative replacement. A conservative replacement refers to a replacement between amino acids of the same type. In one embodiment, the replacement is a non-conservative replacement. A non-conservative replacement refers to a replacement between amino acids of different types. The type of amino acids can be in terms of various properties, such as size, charge, acidity, hydrophilicity/hydrophobicity, polarity, amphiphilicity, and the like. In one embodiment, one or more of Y21, Y32, Y59, Y71, Y90, and Y101 are deleted. In one embodiment, Y90 is deleted. In one embodiment, one or more of Y21, Y32, Y59, Y71, Y90 and Y101 are replaced with F. In one embodiment, Y90 is replaced with F. In one embodiment, one or more of R1, V2, K3, F4, S5, R6, S7, A8, D9, A10, P11, A12, Y13, Q14, Q15, G16, Q17, and N18 are deleted. In one embodiment, V2, D9 and/or Q15 are deleted. In one embodiment, one or more of R1, V2, K3, F4, S5, R6, S7, A8, D9, A10, P11, A12, Y13, Q14, Q15, G16, Q17, and N18 are replaced. In one embodiment, V2 is replaced with L, D9 is replaced with E, and/or Q15 is replaced with K.

In one embodiment, compared to the native sequence (e.g., SEQ ID NO: 4, corresponding to positions 52-163 of the amino acid sequence set forth in NP_000725.1), the modified CD33 signaling domain comprises a Y90F replacement. In one embodiment, the modified CD3ζ signaling domain comprises one or more of V2L, D9E and/or Q15K replacements. In one embodiment, the modified CD3ζ signaling domain comprises a Y90F replacement and one or more of V2L, D9E and/or Q15K replacements. In one embodiment, the modified CD33 signaling domain comprises a Q15K replacement. In one embodiment, the modified CD3ζ signaling domain comprises V2L, Q15K and Y90F replacements. In one embodiment, the modified CD3ζ signaling domain comprises V2L, D9E, Q15K and Y90F replacements.

In one embodiment, the modified CD3ζ signaling domain comprises, consists essentially of, or consists of the amino acid sequence set forth in SEQ ID NO: 6, 8 or 10.

4. Method of Optimizing a Chimeric Antigen Receptor

In one aspect, the present invention relates to a method of optimizing a chimeric antigen receptor, which comprises as a step the above method of modifying a signaling domain from CD3ζ.

The method of optimizing the chimeric antigen receptor of the present invention (specifically, the method of modifying the signaling domain from CD3ζ) can be used alone or in combination with other methods of optimizing the chimeric antigen receptor (e.g., the method of modifying the co-stimulatory domain).

The present invention also relates to an optimized chimeric antigen receptor obtained by said method.

5. Optimized Chimeric Antigen Receptor

In one aspect, the present invention relates to an optimized chimeric antigen receptor, which comprises the above modified signaling domain from CD3ζ as a component.

The optimized chimeric antigen receptor of the present invention may comprise not only the modified signaling domain from CD3ζ, but also modified other components, such as a modified co-stimulatory domain.

In one embodiment, the present invention provides an optimized chimeric antigen receptor for CD19 comprising:

(1) an antigen binding domain for CD19, particularly amino acids at positions of 23 to 267 of SEQ ID NO:2;
(2) a hinge region, particularly CD28 hinge region, particularly amino acids at positions of 268 to 307 of SEQ ID NO:2;
(3) a transmembrane region, particularly CD28 transmembrane region, particularly amino acids at positions of 308 to 333 of SEQ ID NO:2;
(4) a co-stimulatory domain, particularly CD28 co-stimulatory domain, particularly amino acids at positions of 334 to 374 of SEQ ID NO:2; and
(5) a signaling domain, particularly modified CD3ζ particularly amino acid sequences selected from the group consisting of SEQ ID NOs: 6, 8 and 10.

Unless otherwise specified, the technical solutions described herein can be combined arbitrarily.

Sequence Description

| SEQ ID NO | Description | Sequence |
|---|---|---|
| 1 | nucleic acid sequence of CD19 CAR molecular | ATGCTGCTGCTGGTGACCAGCCTGCTGCTGTGTGAGTTACCA CACCCAGCATTCCTCCTGATCCCAGACATCCAGATGACACAG ACTACATCCTCCCTGTCTGCCTCTCTGGGAGACAGAGTCACC ATCAGTTGCAGGGCAAGTCAGGACATTAGTAAATATTTAAA TTGGTATCAGCAGAAACCAGATGGAACTGTTAAACTCCTGAT CTACCATACATCAAGATTACACTCAGGAGTCCCATCAAGGTT CAGTGGCAGTGGGTCTGGAACAGATTATTCTCTCACCATTAG CAACCTGGAGCAAGAAGATATTGCCACTTACTTTTGCCAACA GGGTAATACGCTTCCGTACACGTTCGGAGGGGGGACTAAGT TGGAAATAACAGGCTCCACCTCTGGATCCGGCAAGCCCGGA TCTGGCGAGGGATCCACCAAGGGCGAGGTGAAACTGCAGG AGTCAGGACCTGGCCTGGTGGCGCCCTCACAGAGCCTGTCC GTCACATGCACTGTCTCAGGGGTCTCATTACCCGACTATGGT GTAAGCTGGATTCGCCAGCCTCCACGAAAGGGTCTGGAGTG GCTGGGAGTAATATGGGGTAGTGAAACCACATACTATAATT CAGCTCTCAAATCCAGACTGACCATCATCAAGGACAACTCCA AGAGCCAAGTTTTCTTAAAAATGAACAGTCTGCAAACTGATG ACACAGCCATTTACTACTGTGCCAAACATTATTACTACGGTG GTAGCTATGCTATGGACTACTGGGGTCAAGGAACCTCAGTC ACCGTCTCCTCAATTGAAGTTATGTATCCTCCTCCTTACCTAG ACAATGAGAAGAGCAATGGAACCATTATCCATGTGAAAGGG AAACACCTTTGTCCAAGTCCCCTATTTCCCGGACCTTCTAAGC CCTTTTGGGTGCTGGTGGTGGTTGGGGGAGTCCTGGCTTGC TATAGCTTGCTAGTAACAGTGGCCTTTATTATTTTCTGGGTG AGGAGTAAGAGGAGCAGGCTCCTGCACAGTGACTACATGA ACATGACTCCCCGCCGCCCCGGGCCCACCCGCAAGCATTACC AGCCCTATGCCCCACCACGCGACTTCGCAGCCTATCGCTCCC GCGTGAAGTTCAGCCGCAGCGCCGACGCCCCCGCCTACCAG CAGGGCCAGAACCAGCTGTACAACGAGCTGAACCTGGGCC GCCGCGAGGAGTACGACGTGCTGGACAAGCGCCGCGGCCG CGACCCCGAGATGGGCGGCAAGCCCCGCCGCAAGAACCCCC AGGAGGGCCTGTACAACGAGCTGCAGAAGGACAAGATGGC CGAGGCCTACAGCGAGATCGGCATGAAGGGCGAGCGCCGC CGCGGCAAGGGCCACGACGGCCTGTACCAGGGCCTGAGCA CCGCCACCAAGGACACCTACGACGCCCTGCACATGCAGGCC CTGCCCCCCGCTAA |
| 2 | amino acid sequence of CD19 CAR molecule | MLLLVTSLLLCELPHPAFLLIPDIQMTQTTSSLSASLGDRVTISCR ASQDISKYLNWYQQKPDGTVKLLIYHTSRLHSGVPSRFSGSGSG TDYSLTISNLEQEDIATYFCQQGNTLPYTFGGGTKLEITGSTSGS GKPGSGEGSTKGEVKLQESGPGLVAPSQSLSVTCTVSGVSLPDY GVSWIRQPPRKGLEWLGVIWGSETTYYNSALKSRLTIIKDNSKS QVFLKMNSLQTDDTAIYYCAKHYYYGGSYAMDYWGQGTSVT VSSIEVMYPPPYLDNEKSNGTIIHVKGKHLCPSPLFPGPSKPFW VLVVVGGVLACYSLLVTVAFIIFWVRSKRSRLLHSDYMNMTPR RPGPTRKHYQPYAPPRDFAAYRSRVKFSRSADAPAYQQGQNQ LYNELNLGRREEYDVLDKRRGRDPEMGGKPRRKNPQEGLYNE LQKDKMAEAYSEIGMKGERRRGKGHDGLYQGLSTATKDTYDA LHMQALPPR |
| 3 | nucleic acid sequence of CD3 ζ intracellular region of unmodified CD19 CAR molecule (CD3ζ-0) | AGAGTGAAGTTCAGCAGGAGCGCAGACGCCCCCGCGTACC AGCAGGGCCAGAACCAGCTCTATAACGAGCTCAATCTAGGA CGAAGAGAGGAGTACGATGTTTTGGACAAGAGACGTGGCC GGGACCCTGAGATGGGGGGAAAGCCGAGAAGGAAGAACC CTCAGGAAGGCCTGTACAATGAACTGCAGAAAGATAAGATG GCGGAGGCCTACAGTGAGATTGGGATGAAAGGCGAGCGCC |

-continued

Sequence Description

| SEQ ID NO | Description | Sequence |
|---|---|---|
| | | GGAGGGGCAAGGGGCACGATGGCCTTTACCAGGGTCTCAG<br>TACAGCCACCAAGGACACCTACGACGCCCTTCACATGCAGG<br>CCCTGCCCCCTCGC |
| 4 | amino acid sequence of CD3 ζ intracellular region of unmodified CD19 CAR molecule (CD3ζ-0) | RVKFSRSADAPAYQQGQNQLYNELNLGRREEYDVLDKRRGRD<br>PEMGGKPRRKNPQEGLYNELQKDKMAEAYSEIGMKGERRRG<br>KGHDGLYQGLSTATKDTYDALHMQALPPR |
| 5 | nucleic acid sequence of CD19 CAR CD3ζ-3 | AGAGTGAAGTTCAGCAGGAGCGCAGACGCCCCCGCGTACC<br>AGAAGGGCCAGAACCAGCTCTATAACGAGCTCAATCTAGGA<br>CGAAGAGAGGAGTACGATGTTTTGGACAAGAGACGTGGCC<br>GGGACCCTGAGATGGGGGGAAAGCCGAGAAGGAAGAACC<br>CTCAGGAAGGCCTGTACAATGAACTGCAGAAAGATAAGATG<br>GCGGAGGCCTACAGTGAGATTGGGATGAAAGGCGAGCGCC<br>GGAGGGGCAAGGGGCACGATGGCCTTTACCAGGGTCTCAG<br>TACAGCCACCAAGGACACCTACGACGCCCTTCACATGCAGG<br>CCCTGCCCCCTCGC |
| 6 | amino acid sequence of CD19 CAR CD3ζ-3 (Q15K) | RVKFSRSADAPAYQKGQNQLYNELNLGRREEYDVLDKRRGRD<br>PEMGGKPRRKNPQEGLYNELQKDKMAEAYSEIGMKGERRRG<br>KGHDGLYQGLSTATKDTYDALHMQALPPR |
| 7 | nucleic acid sequence of CD19 CAR CD3ζ-12 | AGACTGAAGTTCAGCAGGAGCGCAGACGCCCCCGCGTACCA<br>GAAGGGCCAGAACCAGCTCTATAACGAGCTCAATCTAGGAC<br>GAAGAGAGGAGTACGATGTTTTGGACAAGAGACGTGGCCG<br>GGACCCTGAGATGGGGGAAAGCCGAGAAGGAAGAACCCT<br>CAGGAAGGCCTGTTCAATGAACTGCAGAAAGATAAGATGGC<br>GGAGGCCTACAGTGAGATTGGGATGAAAGGCGAGCGCCGG<br>AGGGGCAAGGGGCACGATGGCCTTTACCAGGGTCTCAGTA<br>CAGCCACCAAGGACACCTACGACGCCCTTCACATGCAGGCC<br>CTGCCCCCTCGC |
| 8 | amino acid sequence of CD19 CAR CD3ζ-12 (V2L/Q15K/Y90F) | RLKFSRSADAPAYQKGQNQLYNELNLGRREEYDVLDKRRGRD<br>PEMGGKPRRKNPQEGLYNELQKDKMAEAYSEIGMKGERRRG<br>KGHDGLFQGLSTATKDTYDALHMQALPPR |
| 9 | nucleic acid sequence of CD19 CAR CD3ζ-14 | AGACTGAAGTTCAGCAGGAGCGCAGAGGCCCCCGCGTACC<br>AGAAGGGCCAGAACCAGCTCTATAACGAGCTCAATCTAGGA<br>CGAAGAGAGGAGTACGATGTTTTGGACAAGAGACGTGGCC<br>GGGACCCTGAGATGGGGGAAAGCCGAGAAGGAAGAACC<br>CTCAGGAAGGCCTGTTCAATGAACTGCAGAAAGATAAGATG<br>GCGGAGGCCTACAGTGAGATTGGGATGAAAGGCGAGCGCC<br>GGAGGGGCAAGGGGCACGATGGCCTTTACCAGGGTCTCAG<br>TACAGCCACCAAGGACACCTACGACGCCCTTCACATGCAGG<br>CCCTGCCCCCTCGC |
| 10 | amino acid sequence of CD19 CAR CD3ζ-14 (V2L/D9E/Q15K/Y90F) | RLKFSRSAEAPAYQKGQNQLYNELNLGRREEYDVLDKRRGRDP<br>EMGGKPRRKNPQEGLYNELQKDKMAEAYSEIGMKGERRRGK<br>GHDGLFQGLSTATKDTYDALHMQALPPR |

EXAMPLES

Example 1: Intracellular CD3ζ signaling domain modification

This example uses a CAR molecule that sequentially comprises scFv targeting CD19 antigen, CD28 hinge region, CD28 transmembrane region, CD28 co-stimulatory signaling domain, and CD3ζ signaling domain as an example to show effects of the modified CD3ζ signaling domain on CAR-T cell traits and functions.

The nucleic acid sequence of the CD19 CAR molecule is set forth in SEQ ID NO: 1, and the amino acid sequence is set forth in SEQ ID NO: 2.

By modifying the amino acid sites related to signal transmission in the intracellular signal region of CD3ζ, the final goal is to improve the intracellular signal transmission pathway of CAR-T cells, enhance the ability of CAR-T cells to expand and sustain in vivo, improve cytokine secretion, and thereby improve the antitumor activity of CAR-T cells.

For the unmodified CD19 CAR molecule, the nucleic acid sequence of CD3ζ intracellular region (CD3ζ-0) is set forth in SEQ ID NO: 3, and the amino acid sequence thereof is set forth in SEQ ID NO: 4.

For the modified CD19 CAR molecule, the CD3ζ-3 nucleic acid sequence of CD19 CAR is set forth in SEQ ID NO: 5, and the amino acid sequence thereof is set forth in SEQ ID NO: 6; the CD3ζ-12 nucleic acid sequence of CD19 CAR is set forth in SEQ ID NO: 7, and the amino acid sequence thereof is set forth in SEQ ID NO: 8; the CD3ζ-14 nucleic acid sequence of CD19 CAR is set forth in SEQ ID NO: 9, and the amino acid sequence thereof is set forth in SEQ ID NO: 10.

Figure 2:
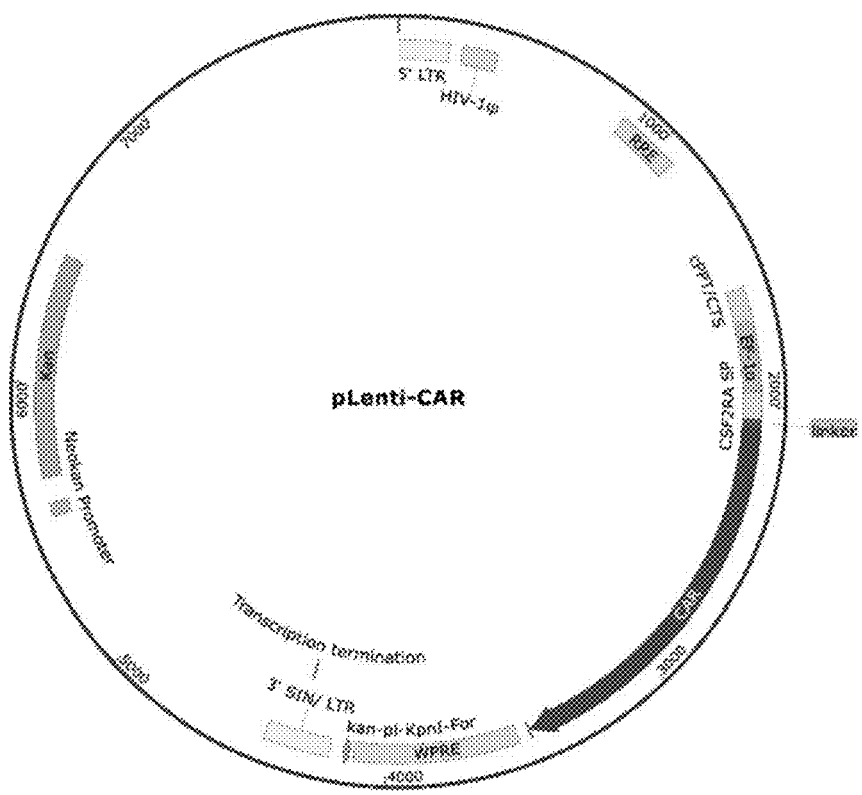
FIG. 2 shows a schematic diagram of the vector pLenti-CAR.

The CD3ζ intracellular signaling domain as mentioned above is synthesized by gene synthesis method, and is connected with the extracellular binding region, hinge region, transmembrane region and intracellular co-stimulatory domain by PCR to form a complete CAR molecule. The CAR-encoding molecule was inserted into the lentiviral vector pLenti6.3/V5 (Thermo Fisher, Waltham, MA, USA) (FIG. 2).

In this example, the molecular structures of the CARs with the modified CD3ζ signaling domain comprise: αCD19-CD28-CD3ζ-0, αCD19-CD28-CD3ζ-3, αCD19-CD28-CD3ζ-12, and αCD19-CD28-CD3ζ-14.

1. Changes of Proliferation Ability and Characteristics In Vitro of CAR-T Cells after CD3ζ Modification T cells were isolated from peripheral blood mononuclear cells of healthy volunteers (Miaotong (Shanghai) Biotechnology Co., Ltd., China). The isolated and purified T cells were seeded and cultured at $1.5 \times 10^6$ cells/ml into KBM581 medium (Corning, USA), CD3/CD28 DYNABEADS™ (Thermo Fisher) were added into the culture system according to the ratio of T cells to DYNABEADS™ at 1:1, and after IL-2 (Shandong Jintai Bioengineering Co., Ltd., China) (500 IU/ml) was added and cultured for 48 hours, the CAR containing unmodified or modified CD3ζ was transduced into T cells by lentivirus. 24 hours after virus infection of cells, the cells were centrifuged to change the medium, and fresh KBM581 containing IL-2 (500 IU/ml) was added to continue the culture. After 4 days of cell culture, all cells in the culture system were collected, and the DYNABEADS™ in the culture system were removed with a magnetic stand, after T cells were centrifuged and counted, K562-CD19$^+$ cells irradiated with 20 Gy (National Experimental Cell Resource Sharing Platform, China) were used as supporting cells, and T cells were seeded in fresh KBM581 containing IL-2 (500 IU/ml) at $1.0 \times 10^6$ cells/ml to continue the culture. On the 7th and 9th days, the cells were centrifuged and counted respectively, and fresh KBM581 containing IL-2 (500 IU/ml) was added to continue the culture, and corresponding cell samples were collected and analyzed by flow cytometry to analyze the expression rate of CAR, the expression of immune depletion molecules PD1 and LAG3, and the proliferation rate of CAR-T cells in each group from day 7 to day 9 of culture was calculated, basically as described previously (Gattinoni et al. Nature Medicine 17 (10): 1290, 2011).

Figure 3:
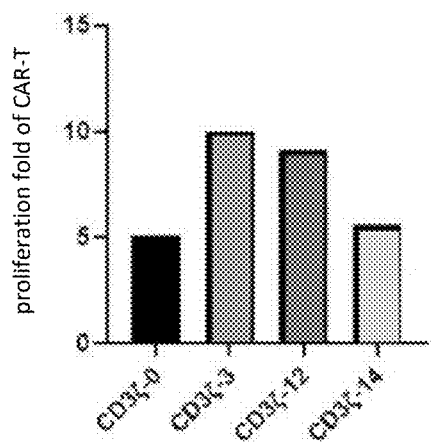
FIG. 3 shows a comparison of the proliferation rate of CD3ζ unmodified CAR-T cells (CD3ζ-0) and CD3ζ modified CAR-T cells (CD3ζ-3, CD3ζ-12 and CD3ζ-14) after receiving antigen stimulation.
Figure 4:
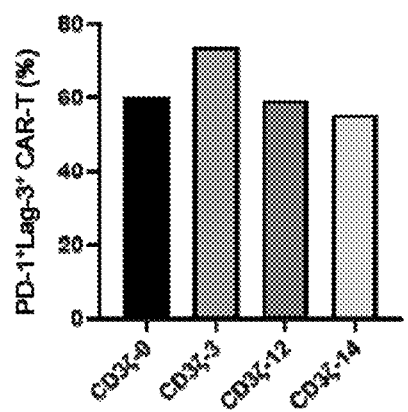
FIG. 4 shows a comparison of the ratio of PD-1$^+$LAG-3$^+$ cells at the 10th day of cell culture of CD3ζ unmodified CAR-T cells (CD3ζ-0) and CD3ζ modified CAR-T cells (CD3ζ-3, CD3ζ-12 and CD3ζ-14) after antigen stimulation.

As shown in FIG. 3, compared with unmodified CD3ζ-0, the modified CD3ζ-3 and CD3ζ-12 approximately doubled the proliferation rate of CAR-T cells after 48 hours of target antigen stimulation. This helps CAR-T cells rapidly expand upon contact with the corresponding tumor cells to increase the rate of tumor killing and prevent the risk of recurrence due to immune escape. As shown in FIG. 4, compared with the unmodified CD3ζ-0, the modified CD3ζ-12 and CD3ζ-14 prompt the ratio of the corresponding CAR-T cells in a depleted state (PD-1$^+$LAG-3$^+$) to decrease by about 5%. This is conducive to improving the survival cycle of the corresponding CAR-T cells in vivo and reducing the risk of disease recurrence.

2. Changes of Antitumor Ability, Proliferation Ability and Persistence Ability of CAR-T Cells In Vivo after CD3ζ Modification The isolated and purified T cells were seeded and cultured at $1.5 \times 10^6$ cells/ml into fresh KBM581, and after 48 hours after adding CD3/CD28 DYNABEADS™ to culture cells according to the ratio of T cells and DYNABEADS™ at 1:1, T cells were transduced with the corresponding lentiviruses of CD3ζ-0, CD3ζ-3, CD3ζ-12 and CD3ζ-14 CARs, respectively, to prepare the corresponding CAR-T cells (T cells not infected with lentivirus were also cultured for use in control experiments). 24 hours after virus infection, the cells were centrifuged to change the medium, counted, seeded and cultured at $0.8 \times 10^6$ cells/ml into fresh KBM 581 containing IL-2 (500 IU/ml), continue to maintain the original DYNABEADS™ stimulation culture, the cells were centrifuged every 48 hours to change the medium, seeded and cultured at $0.8 \times 10^6$ cells/ml into fresh KBM581 containing IL-2 (500 IU/ml), on day 11 of the culture, cells were harvested and counted, at the same time, the corresponding cell samples were taken for flow cytometry to analyze the CAR expression rate, and the cells were resuspended in cryopreservation solution and stored in liquid nitrogen until use. A total of 36 6-8 week old NCG mice (Jiangsu Jicui Yaokang Biotechnology Co., Ltd., China) were divided into 6 mice/group, a total of 6 groups. Five days after each mouse was injected with $1.0 \times 10^6$ Nalm-6-LAE cells (ATCC, USA) from the tail vein, mice were subjected to an intravital imaging analysis of luciferase (Lumina II Small Animal Intravital Imaging System, PerkinElmer, USA) for verifying the success of the mouse leukemia model. After the successful establishment of the mouse leukemia model, each group of mice was injected with CD3ζ-0, CD3ζ-3, CD3ζ-12, CD3ζ-14 CD19-CAR-T cells ($2 \times 10^6$ cells/mouse) from the tail vein, respectively, at the same time, other two groups of mice were injected, respectively, with corresponding number of T cells and corresponding volume of normal saline as controls. Mouse peripheral blood CAR-T detection was performed on the 2, 4, 8, 12, 21 and 28 days after CAR-T cell injection, and the intravital imaging analysis of mice was performed one day before or one day after blood collection. Among them, the T cell injection group and the normal saline injection group all died before 28 days after the injection, and in each peripheral blood CAR-T cell detection before death, CAR-T cells could not be detected in the peripheral blood of mice injected with pure T cells and normal saline groups.

Figure 5:
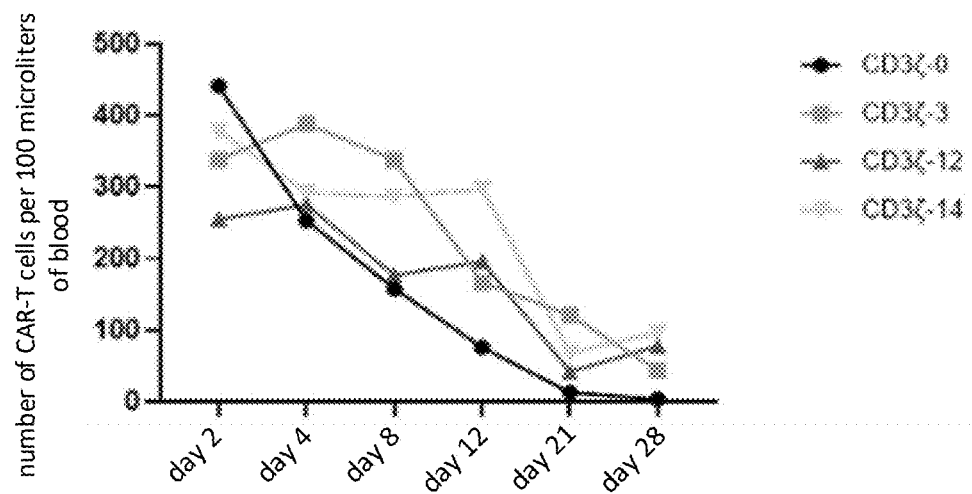
FIG. 5 shows a comparison of the persistence of CAR-T cell treatment of leukemia mice in each group.
Figure 6:
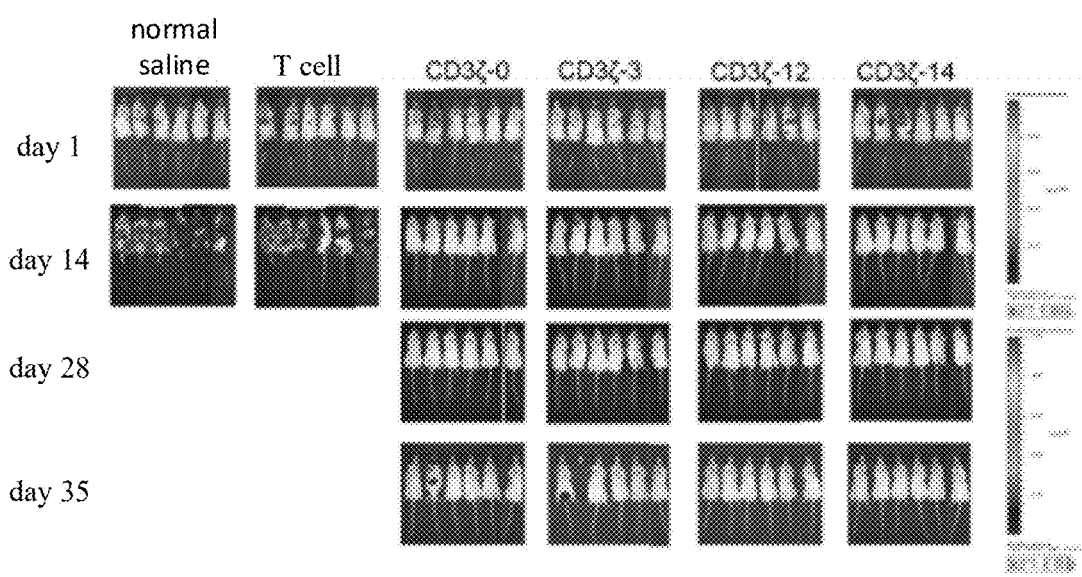
FIG. 6 shows a comparison of the effect of CAR-T cell treatment of leukemia mice in each group.

As shown in FIG. 5, compared with unmodified CD3ζ-0, the persistence of the corresponding CAR-T cells of CD3ζ-3, CD3ζ-12 and CD3ζ-14 in vivo was significantly improved. Specifically, after Nalm-6 cells were injected into NCG mice to successfully establish a B-ALL leukemia model, anti-CD19 CAR-T cells were injected into the tail vein of mice for a cell therapy, and then the CAR-T cells in the peripheral blood of mice were detected. CD3ζ-0 control mice with unmodified CD3ζ had no detectable CAR-T cells in the peripheral blood after 21 days, while CD3ζ-3, CD3ζ-12 and CD3ζ-14 mice could still be detected higher levels of CAR-T cells in the peripheral blood 28 days after CAR-T injection. As shown in FIG. 6, compared with unmodified CD3ζ-0, the effect of corresponding CAR-T cells of CD3ζ-12 and CD3-14 in vivo was significantly improved. Specifically, after Nalm-6 cells were injected into NCG mice to successfully establish a B-ALL leukemia model, anti-CD19 CAR-T cells were injected into the tail vein of mice for treatment. One mouse in both CD3ζ-0 and CD3ζ-3 groups relapsed, however, the relapsed mice in the CD3ζ-0 group had higher tumor burden, while neither CD3ζ-12 nor CD3ζ-14 mice had recurrence. This shows that the antitumor activities of the modified CAR-T cells are enhanced and the risk of disease recurrence is reduced.

From the above in vitro and in vivo experimental results, it can be seen that the inventor's modification of CD3ζ is very successful, especially CD3ζ-12 and CD3ζ-14, which greatly improves the persistence and antitumor activity of CAR-T cells in vivo, which is of great value to clinical treatment.

This description is sufficient to enable those skilled in the art to practice the invention. The examples are provided for illustrative purposes only, and are not intended to limit the scope of the invention in any way. Indeed, according to the above description, in addition to those shown and described herein, various modifications of the invention will become apparent to those skilled in the art and are within the scope of the appended claims.

The invention claimed is:

1. A modified signaling domain from CD3ζ, which consists of the amino acid sequence set forth in SEQ ID NO: 6, 8 or 10.

2. A chimeric antigen receptor, which comprises the modified signaling domain of claim 1.

3. An animal cell, which comprises the chimeric antigen receptor of claim 2.

* * * * *